J. P. BEM.
RESILIENT WHEEL.
APPLICATION FILED OCT. 18, 1916.
1,263,513.
Patented Apr. 23, 1918.
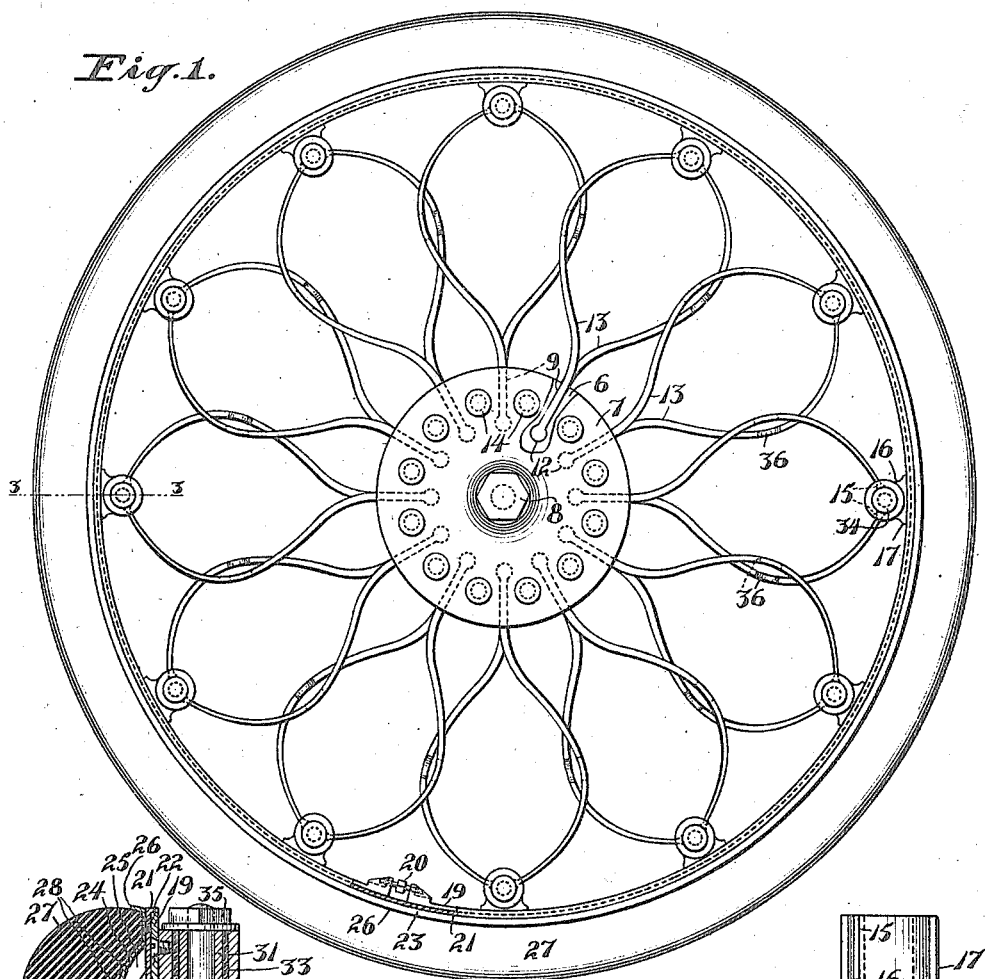
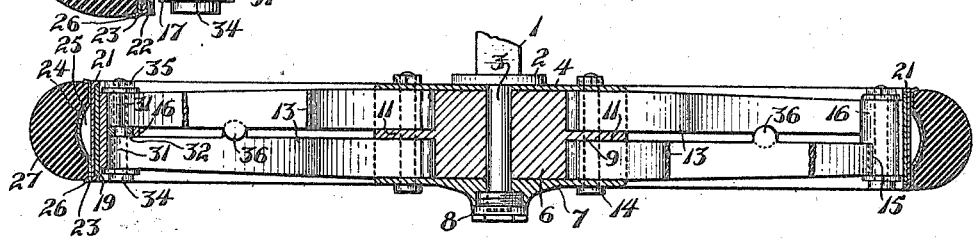
Inventor
Joseph P. Bem
per F. M. Wright
Attorney

UNITED STATES PATENT OFFICE.

JOSEPH P. BEM, OF BERKELEY, CALIFORNIA, ASSIGNOR TO BEM SHOCK ABSORBING WHEEL COMPANY, OF SAN FRANCISCO, CALIFORNIA, A CORPORATION OF CALIFORNIA.

RESILIENT WHEEL.

1,263,513. Specification of Letters Patent. Patented Apr. 23, 1918.

Application filed October 18, 1916. Serial No. 126,421.

*To all whom it may concern:*

Be it known that I, JOSEPH P. BEM, a citizen of the United States, residing at Berkeley, in the county of Alameda and State of California, have invented new and useful Improvements in Resilient Wheels, of which the following is a specification.

The object of the present invention is to provide a resilient wheel which can be substituted with advantage for the wheels equipped with pneumatic tires at present in use and thereby avoid the dangers and expense incident to the use of such tires.

In the accompanying drawing, Figure 1 is a broken side view of the wheel; Fig. 2 is a diametral section thereof; Fig. 3 is an enlarged cross section on the line 3—3 of Fig. 1; Fig. 4 is a plan view of one of the housings for the outer ends of the spokes.

Referring to the drawing, 1 indicates a wheel axle having a collar 2 and a cylindrical spindle 3. On said spindle and abutting against said collar 2 is a disk 4. Abutting against said disk is a hub 6, and abutting against said hub is a disk 7, having a central recess to receive a nut 8 screwed upon the outer end of the spindle. Said hub 6 is formed in each end with a circular series of recesses 9, opening through the periphery of the disk and also opening through the adjacent end of the disk, the recesses in the two ends of the disk being separated by a web 11. Each recess extends in a radial direction, and is of a uniform width for the greater portion of its length, but is enlarged and rounded at the inner end, as shown at 12. Fitting tightly in said recesses are the inner portions of spring spokes 13, said inner portions being of uniform width and thickness except at the extreme inner ends, which are enlarged and rounded to completely fill the rounded ends of the recesses. After the inner terminal portions of the spring spokes are inserted in said recesses they are secured therein by means of said disks 4 and 7, which are secured together by means of bolts 14 passing from end to end of the hub through the portions thereof between said recesses. The recesses in one end of the hub register with those in the other end, so that the inner portions of the spring spokes, extending from the two ends of the hub also register with each other, in pairs, but immediately after leaving said hub the spring spokes of each pair diverge and then extend in concave curves, the extreme outer ends of the spokes extending at an angle of 120° with each other through open-ended slots 15 in a cylindrical housing 16 having a base 17, secured by means of screws 18, best shown in Fig. 3, to a spoke rim 19, the ends of which can be contracted or extended by means of a turn buckle 20 shown in Fig. 1. By the above construction of spring spoke it will be seen that the greatest resiliency possible is obtained with a comparatively straight form of spoke.

The spoke rim 19 is contained within a channel-shaped tire rim 21, to which is riveted, as shown at 22, an auxiliary tire rim 23, the central portion 24 of which is concavo-convex in cross section, so as to form with said auxiliary rim 23 a chamber 25. Said auxiliary rim is provided with side flanges 26 to hold therebetween a solid rubber tire 27, and the outer surface of the concavo-convex portion of the auxiliary rim is indented, a shown at 28, to form a good gripping surface to hold the tire 27 against slipping. With this construction there is effected a considerable saving of rubber, and, since the outer edges of the rim are supported by the rubber, much vibration in the center of the rim is avoided.

The outer end 31 of each spoke is a hollow cylinder in form and is contained within the corresponding terminal portion of the housing, a washer 32 being interposed between the cylindrical outer ends of the two spokes of a pair to maintain them spaced from each other. After said outer ends have thus been secured in the housing, molten rubber 33 is then poured into said housing to fill up the interstices therein, and a bolt 34 is passed through said outer ends and washer and secured by a nut 35, said nut and the head of the bolt being sufficiently wide to entirely cover the spaces between the housing and the outer ends of the spokes, so that dust is completely excluded from entrance to the housing.

By the above described modes of attaching both the inner and outer ends of the spring spokes any one of the spokes can be removed without disturbing the others.

Each spoke tapers outwardly in width, as shown in Fig. 2, and in thickness, as shown in Fig. 1, and, at the most outwardly curved part of the concave portion of the spoke the inner edge of each spoke, or that which is nearest to the next adjacent spoke extending from the other end of the hub, is formed with an inward extension 36. On straightening out the spokes, these extensions from such adjacent spokes approach each other, and eventually contact with each other, so that said extensions form stops limiting the extent to which the spokes can be moved in a direction to straighten them out from their concave form. It will be observed that the spokes cross each other almost in a radial direction, and this allows of considerable resiliency and strength in a comparatively light spoke. With the yielding portion of the spoke extended in a direction at right angles to the radius, a very much stronger spring spoke would be required. These extensions are particularly desirable for use in heavy cars. With light cars the extensions may not be necessary.

I claim:—

1. In a resilient wheel, in combination with a hub and a rim, cylindrical housings having bases secured to said rim, a bolt passing centrally through each housing, spring spokes secured in said hub in pairs, the spokes of each pair being secured in opposite ends of the hub, the outer ends of the spokes of each pair passing through slots in opposite ends of the housing and terminating in cylindrical portions surrounding said bolt, a nut securing said bolt in position in said housing, said nut and the head of the bolt having flanges closing the space between the cylindrical portions of the spokes and the housing.

2. In a resilient wheel, in combination with a hub and a rim, cylindrical housings having bases secured to said rim, a bolt passing centrally through each housing, spring spokes secured in said hub in pairs, the spokes of each pair being secured in opposite ends of the hub, the outer ends of the spokes of each pair passing through slots in opposite ends of the housing and terminating in cylindrical portions surrounding said bolt, a nut securing said bolt in position in said housing, said nut and the head of the bolt having flanges closing the space between the cylindrical portions of the spokes and the housing, and soft rubber in said space.

3. In a resilient wheel, in combination with a hub and a rim, cylindrical housings having bases secured to said rim, a bolt passing centrally through each housing, spring spokes secured in said hub in pairs, the spokes of each pair being secured in opposite ends of the hub, the outer ends of the spokes of each pair passing through slots in opposite ends of the housing and terminating in cylindrical portions surrounding said bolt, a washer surrounding the bolt and interposed between the cylindrical portions of the spokes, a nut securing said bolt in position in said housing, said nut and the head of the bolt having flanges closing the space between the cylindrical portions of the spokes and the housing.

4. In a resilient wheel, in combination with a hub and a rim, spring spokes arranged in pairs, the spokes of each pair having their inner ends contained in radially extending recesses in opposite ends of the hub, and then first diverging from, and then converging to, each other, and means for securing the outer ends of the spokes to the rim of the wheel, the most outwardly curved portions of said spokes having projections, each toward the adjacent spoke whose inner end is secured in the other end of the hub, adapted to engage one another to prevent straightening out of said spokes.

5. In a resilient wheel, in combination with a hub and a rim, spring spokes arranged in pairs, the spokes of each pair having their inner ends contained in outwardly extending recesses in opposite ends of the hub, and then first diverging from, and then converging to, each other, a pivot, means for securing the outer ends of the spokes of each pair thereon, a housing inclosing said pivot, and soft rubber contained in said housing for excluding dust and absorbing vibration in said spokes.

JOSEPH P. BEM.